(12) United States Patent
Guo

(10) Patent No.: US 11,636,289 B2
(45) Date of Patent: Apr. 25, 2023

(54) METHOD, APPARATUS, AND DEVICE FOR CLASSIFYING LIDAR POINT CLOUD DATA, AND STORAGE MEDIUM

(71) Applicants: Beijing GreenValley Technology Co., Ltd., Beijing (CN); Shenzhen GreenValley Intelligent Technology Co., Ltd., Guangdong (CN)

(72) Inventor: Yanming Guo, Beijing (CN)

(73) Assignee: Beijing GreenValley Technology Co., Ltd.

( * ) Notice: Subject to any disclaimer, the term of this patent is extended or adjusted under 35 U.S.C. 154(b) by 1091 days.

(21) Appl. No.: 16/304,673

(22) PCT Filed: Dec. 21, 2017

(86) PCT No.: PCT/CN2017/117607
§ 371 (c)(1),
(2) Date: Nov. 26, 2018

(87) PCT Pub. No.: WO2019/104780
PCT Pub. Date: Jun. 6, 2019

(65) Prior Publication Data
US 2021/0224613 A1 Jul. 22, 2021

(30) Foreign Application Priority Data
Nov. 29, 2017 (CN) .......................... 201711222953.2

(51) Int. Cl.
*G06K 9/62* (2022.01)
*G06N 20/00* (2019.01)
(Continued)

(52) U.S. Cl.
CPC .......... *G06K 9/6276* (2013.01); *G01S 7/4802* (2013.01); *G01S 17/89* (2013.01);
(Continued)

(58) Field of Classification Search
None
See application file for complete search history.

(56) References Cited

U.S. PATENT DOCUMENTS

2013/0218472 A1* 8/2013 Fu ..................... G06V 20/176
702/5
2017/0358068 A1* 12/2017 Strebel ................. G01S 7/4802

FOREIGN PATENT DOCUMENTS

CN 103324945 A 9/2013
CN 104282038 A 1/2015
(Continued)

OTHER PUBLICATIONS

Weinmann, Martin, et al. "Semantic point cloud interpretation based on optimal neighborhoods, relevant features and efficient classifiers." ISPRS Journal of Photogrammetry and Remote Sensing 105 (2015): 286-304. (Year: 2015).*
(Continued)

*Primary Examiner* — David Perlman
(74) *Attorney, Agent, or Firm* — Dorsey & Whitney LLP

(57) ABSTRACT

A method, an apparatus, and a device for classifying LiDAR point cloud data, and a storage medium. The method includes: acquiring sample point cloud data and LiDAR point cloud data to be classified; building a point cloud classifier according to the sample point cloud data; classifying the LiDAR point cloud data to be classified by the point cloud classifier. In the present disclosure, the point cloud classifier is trained from the sample point cloud data, and the automatic classification is performed by the point cloud classifier for the LiDAR point cloud data to be classified. The sample point cloud data used for training the point cloud classifier includes various tower data and electric power line data. Moreover, after the classification result is obtained from the automatic classification, the speckling
(Continued)

merging optimization is further performed, and the optimization is performed according to the tower position file and the preset optimization rule.

11 Claims, 2 Drawing Sheets

(51) Int. Cl.
  *G01S 7/48* (2006.01)
  *G01S 17/89* (2020.01)
  *G06V 10/40* (2022.01)
  *G06V 20/10* (2022.01)
  *G06V 10/70* (2022.01)

(52) U.S. Cl.
  CPC ......... *G06K 9/6256* (2013.01); *G06K 9/6261* (2013.01); *G06N 20/00* (2019.01); *G06V 10/40* (2022.01); *G06V 10/70* (2022.01); *G06V 20/176* (2022.01)

(56) References Cited

FOREIGN PATENT DOCUMENTS

| CN | 105373814 A | 3/2016 |
|----|-------------|--------|
| CN | 106022381 A | 10/2016 |
| CN | 106650809 A | 5/2017 |
| CN | 107292335 A | 10/2017 |

OTHER PUBLICATIONS

First Office Action issued for Chinese Patent Application No. 2017112229532, dated Apr. 8, 2019, and English Machine Translation.

Second Office Action issued for Chinese Patent Application No. 2017112229532, dated Aug. 12, 2019, and English Machine Translation.

Third Office Action issued for Chinese Patent Application No. 2017112229532, dated Nov. 18, 2019, and English Machine Translation.

\* cited by examiner

METHOD, APPARATUS, AND DEVICE FOR CLASSIFYING LIDAR POINT CLOUD DATA, AND STORAGE MEDIUM

CROSS-REFERENCE TO RELATED APPLICATION

The present disclosure claims the priority to the Chinese Patent Application with the filing No. 201711222953.2, entitled "Method and Apparatus for Classifying LiDAR Point Cloud Data" filed on Nov. 29, 2017 with the State Intellectual Property Office (SIPO) of People's Republic of China, the contents of which are incorporated herein by reference in their entirety.

TECHNICAL FIELD

The present disclosure relates to the technical field of electric power inspection, and particularly to a method, an apparatus, and a device for classifying LiDAR point cloud data, and a storage medium.

BACKGROUND ART

Electric transmission lines are an important part of a power grid, and rapidly and efficiently inspecting status of vegetation and other surface features around electric power lines is of far-reaching significance for an electric power department to achieve real-time monitoring, rapid assessment, and scientific prediction of an electric system.

With the development of LiDAR (Light Detection and Ranging) technologies and drone technologies, currently electric power transmission lines are usually inspected by a LiDAR scanning device mounted on a drone, to obtain LiDAR point cloud data corresponding to the electric power transmission lines. Before the LiDAR point cloud data is used to detect faults and potential hazards of the electric power transmission lines, the LiDAR point cloud data needs to be classified firstly. At present, a mode of manual classification is usually used to classify the LiDAR point cloud data according to types of surface features such as electric power lines, towers, ground points and vegetation.

Since the LiDAR point cloud data has a large volume, the manual classification is accompanied by quite heavy workload and high costs, thus having a low efficiency. Moreover, the manual classification has a low degree of automation, is error-prone, and also has low accuracy of classification.

SUMMARY

In view of this, an object of embodiments of the present disclosure is to provide a method, an apparatus, and a device for classifying LiDAR point cloud data and a storage medium, wherein a point cloud classifier is trained from sample point cloud data, and automatic classification for LiDAR point cloud data to be classified is performed by the point cloud classifier, which greatly reduces factors of manual intervention in a classification process, has a high degree of automation, low costs, and very high efficiency and accuracy, and is not error-prone.

In a first aspect, an embodiment of the present disclosure provides a method for classifying LiDAR point cloud data, wherein the method includes following steps:

acquiring sample point cloud data and LiDAR point cloud data to be classified;

building a point cloud classifier according to the sample point cloud data; and classifying the LiDAR point cloud data to be classified by the point cloud classifier.

In combination with the first aspect, an embodiment of the present disclosure provides a first possible implementation of the first aspect above, wherein the step of building a point cloud classifier according to the sample point cloud data includes following steps:

performing feature extraction for the sample point cloud data to obtain classification features; and performing machine learning training for the classification features to obtain the point cloud classifier.

In combination with the first possible implementation of the first aspect, an embodiment of the present disclosure provides a second possible implementation of the first aspect above, wherein the step of performing feature extraction for the sample point cloud data to obtain classification features includes following steps:

performing K-neighborhood partition for the sample point cloud data, and acquiring a K-neighborhood classification feature;

performing grid neighborhood partition for the sample point cloud data, and acquiring a grid neighborhood classification feature;

performing cylindrical neighborhood partition for the sample point cloud data, and acquiring a cylindrical neighborhood classification feature; and performing spherical neighborhood partition for the sample point cloud data, and acquiring a spherical neighborhood classification feature.

In combination with the second possible implementation of the first aspect, an embodiment of the present disclosure provides a third possible implementation of the first aspect above, wherein the step of performing K-neighborhood partition for the sample point cloud data, and acquiring a K-neighborhood classification feature includes following steps:

selecting from the sample point cloud data K neighborhood points neighboring a first sample point, wherein the first sample point is any point in the sample point cloud data;

constructing a covariance matrix of the first sample point and the K neighborhood points; and calculating the K-neighborhood classification feature corresponding to the first sample point according to the covariance matrix.

In combination with the second possible implementation of the first aspect, an embodiment of the present disclosure provides a fourth possible implementation of the first aspect above, wherein the step of performing grid neighborhood partition for the sample point cloud data, and acquiring a grid neighborhood classification feature includes:

partitioning the sample point cloud data into a plurality of grids with a preset dimension;

acquiring a maximum elevation value of point cloud in a first grid and a minimum elevation value of point cloud in a second grid neighboring the first grid, wherein the first grid is any grid partitioned; and calculating a difference between the maximum elevation value of point cloud and the minimum elevation value of point cloud, and determining the difference as a grid neighborhood classification feature corresponding to the first grid.

In combination with the second possible implementation of the first aspect, an embodiment of the present disclosure provides a fifth possible implementation of the first aspect above, wherein the step of performing cylindrical neighborhood partition for the sample point cloud data, and acquiring a cylindrical neighborhood classification feature includes following steps:
 partitioning the sample point cloud data to obtain a cylindrical neighborhood with a first sample point as a center, a radius of R, and a height of H, wherein the first sample point is any point in the sample point cloud data;
 performing point cloud layering for a cylindrical neighborhood corresponding to the first sample point;
 recording (collecting statistics of) number of points included in each layer, an elevation value of each point included in each layer, and a central point height of each layer; and
 calculating a cylindrical neighborhood classification feature corresponding to the first sample point according to the number of points included in each layer, the elevation value of each point included in each layer, and the central point height of each layer.

In combination with the second possible implementation of the first aspect, an embodiment of the present disclosure provides a sixth possible implementation of the first aspect above, wherein the step of performing spherical neighborhood partition for the sample point cloud data, and acquiring a spherical neighborhood classification feature includes following steps:
 partitioning the sample point cloud data to obtain a spherical neighborhood with a first sample point as a center and a radius of r, wherein the first sample point is any point in the sample point cloud data; and
 calculating a variance of elevation of each point within the spherical neighborhood, and determining the variance of elevation as the spherical neighborhood classification feature corresponding to the first sample point.

In combination with any one of the first aspect to the sixth possible implementation of the first aspect, an embodiment of the present disclosure provides a seventh possible implementation of the first aspect above, wherein the step of classifying the LiDAR point cloud data to be classified by the point cloud classifier includes following step:
 inputting the LiDAR point cloud data to be classified, into the point cloud classifier to obtain a point cloud classification result, wherein the point cloud classification result includes ground points, electric power lines, and towers.

In combination with the seventh possible implementation of the first aspect, an embodiment of the present disclosure provides an eighth possible implementation of the first aspect above, wherein after classifying the LiDAR point cloud data to be classified by the point cloud classifier, the method further includes following step:
 performing speckling merging optimization for the point cloud classification result, and performing classification optimization for the point cloud classification result according to a tower position file and a preset optimization rule.

In combination with any one of the first aspect to the eighth possible implementation of the first aspect, an embodiment of the present disclosure provides a ninth possible implementation of the first aspect above, wherein the sample point cloud data includes tower point cloud data, electric power line point cloud data, and point cloud data of ground point obtained after selection.

In a second aspect, an embodiment of the present disclosure provides an apparatus for classifying LiDAR point cloud data, wherein the apparatus includes:
 an acquiring module, configured to acquire sample point cloud data and LiDAR point cloud data to be classified;
 a building module, configured to build a point cloud classifier according to the sample point cloud data; and
 a classifying module, configured to perform, by the point cloud classifier, classification for the LiDAR point cloud data to be classified.

In combination with the second aspect, an embodiment of the present disclosure provides a first possible implementation of the second aspect above, wherein the building module includes:
 a feature extracting unit, configured to perform feature extraction for the sample point cloud data, to obtain classification features; and
 a training unit, configured to perform machine learning training for the classification features, to obtain the point cloud classifier.

In combination with the first possible implementation of the second aspect, an embodiment of the present disclosure provides a second possible implementation of the second aspect above, wherein the feature extracting unit includes:
 a K-neighborhood feature extracting subunit, configured to perform K-neighborhood partition for the sample point cloud data, and acquire a K-neighborhood classification feature;
 a grid neighborhood feature extracting subunit, configured to perform grid neighborhood partition for the sample point cloud data, and acquire a grid neighborhood classification feature;
 a cylindrical neighborhood feature extracting subunit, configured to perform cylindrical neighborhood partition for the sample point cloud data, and acquire a cylindrical neighborhood classification feature; and
 a spherical neighborhood feature extracting subunit, configured to perform spherical neighborhood partition for the sample point cloud data, and acquire a spherical neighborhood classification feature.

In combination with any one of the second aspect to the second possible implementation of the second aspect, an embodiment of the present disclosure provides a third possible implementation of the second aspect above, wherein the classifying module is configured to: input the LiDAR point cloud data to be classified, into the point cloud classifier to obtain a point cloud classification result, wherein the point cloud classification result includes ground points, electric power lines, and towers.

In combination with the third possible implementation of the second aspect, an embodiment of the present disclosure provides a fourth possible implementation of the second aspect above, wherein the apparatus further includes: an optimization module, configured to perform speckling merging optimization for the point cloud classification result, and perform classification optimization for the point cloud classification result according to a tower position file and a preset optimization rule.

In a third aspect, an embodiment of the present disclosure provides a device for classifying LiDAR point cloud data, including a memory and a processor, wherein the memory is configured to store a program supporting the processor to execute the method of any one of the first aspect, and the processor is configured to execute the program stored in the memory.

In a fourth aspect, an embodiment of the present disclosure provides a computer storage medium, configured to store a computer software instruction used by the method of any one of the first aspect.

In the method, the apparatus, the device, and the storage medium provided in the embodiments of the present disclosure, the sample point cloud data and the LiDAR point cloud data to be classified are acquired; the point cloud classifier is built according to the sample point cloud data; the classification is performed by the point cloud classifier for the LiDAR point cloud data to be classified. In the present disclosure, the point cloud classifier is trained from the sample point cloud data, and the automatic classification is performed by the point cloud classifier for the LiDAR point cloud data to be classified, which greatly reduces the factors of manual intervention in the classification process, and has a high degree of automation and low costs. The sample point cloud data used for training the point cloud classifier includes tower data on various types of towers and electric power line data on various types of lines, thus the data is all-round, thereby the point cloud classifier trained from such sample point cloud data is very high in accuracy and is not error-prone. Moreover, after the classification result is obtained from the automatic classification, the speckling merging optimization is further performed, and the optimization is performed according to the tower position file and the preset optimization rule, thus further improving the classification accuracy.

In order to make the above objects, features, and advantages of the present disclosure more apparent and understandable, preferable embodiments are particularly illustrated below in combination with attached accompanying drawings to make following detailed description.

BRIEF DESCRIPTION OF DRAWINGS

In order to more clearly illustrate technical solutions of embodiments of the present disclosure, accompanying drawings which are needed for description of the embodiments will be introduced briefly below. It should be understood that the accompanying drawings below merely show some embodiments of the present disclosure, therefore, they should not be considered as limiting the scope, and a person ordinarily skilled in the art still can obtain other relevant figures according to these accompanying drawings, without inventive effort.

DETAILED DESCRIPTION OF EMBODIMENTS

In order to make the objects, technical solutions, and advantages of the embodiments of the present disclosure clearer, below the technical solutions in the embodiments of the present disclosure will be described clearly and completely in conjunction with the accompanying drawings in the embodiments of the present disclosure, apparently, some but not all embodiments of the present disclosure are described. Generally, components in the embodiments of the present disclosure, as described and shown in the accompanying drawings herein, may be arranged and designed in various different configurations. Therefore, the detailed description below of the embodiments of the present disclosure provided in the accompanying drawings is not intended to limit the scope of protection of the present disclosure, but merely illustrates chosen embodiments of the present disclosure. All other embodiments obtained by a person skilled in the art based on the embodiments of the present disclosure without any inventive effort shall fall within the scope of protection of the present disclosure.

Considering the mode of manual classification in the prior art, LiDAR point cloud data is classified according to types of surface features such as electric power lines, towers, ground points and vegetation. Since the LiDAR point cloud data has a very large volume, the manual classification is accompanied by quite heavy workload, high costs, and low efficiency. Moreover, the manual classification has a low degree of automation, is error-prone, and also has low accuracy of classification. On this basis, embodiments of the present disclosure provide a method, an apparatus, and a device for classifying LiDAR point cloud data, and a storage medium, which are described below by the embodiments.

Embodiment 1

Figure 1:
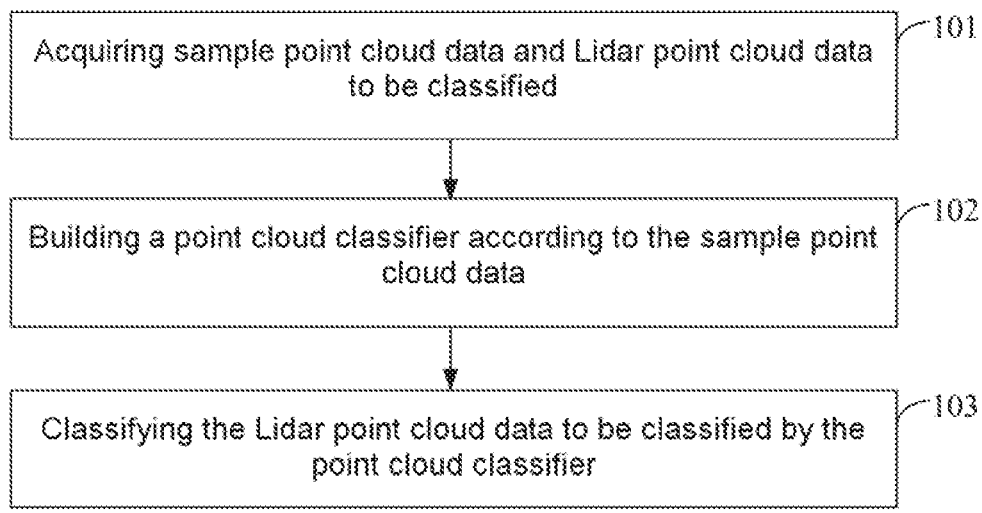
FIG. 1 shows a flowchart of a method for classifying LiDAR point cloud data provided in Embodiment 1 of the present disclosure.

Referring to FIG. 1, the embodiment of the present disclosure provides a method for classifying LiDAR point cloud data, which method specifically includes following steps:

Step 101: acquiring sample point cloud data and LiDAR point cloud data to be classified.

In the embodiment of the present disclosure, a Light Detection and Ranging (LiDAR) device is mounted on a flying platform such as a helicopter and a drone and so on, then an electric power transmission line is inspected by the flying platform such as a helicopter and a drone. In an inspection process, the LiDAR device mounted on the flying platform performs data collection for the electric power transmission line, to obtain LiDAR point cloud data corresponding to the electric power transmission line.

The above sample point cloud data is a training sample manually selected from the original LiDAR point cloud data corresponding to the electric power transmission line. Along the electric power transmission line there are electric power lines, towers, vegetation, and so on, therefore, the LiDAR point cloud data, which is collected by the LiDAR device, includes point cloud data corresponding to the electric power lines, towers, vegetation, and other objects. In order to ensure the accuracy of classification, in the manual selection of the training sample, the towers of different tower types, for example, cat-head type tower, cup type tower, JG shape tower, portal tower, and so on should be considered, and the electric power lines of different line types, for example, single conductor (wire), bundled conductor, and so on should be comprehensively considered, categories of the electric power lines and the towers are manually distinguished, and ground points are distinguished by a filtering algorithm.

The sample point cloud data includes tower point cloud data, electric power line point cloud data, and point cloud data of ground point obtained from the selection. That is, the point cloud data on the towers of different tower types, the point cloud data on the electric power lines of different line types, the point cloud data corresponding to the ground points, and so on constitute the above sample point cloud data. That is, the LiDAR point cloud data to be classified is point cloud data collected by the LiDAR device except the sample point cloud data.

Step 102: building a point cloud classifier according to the sample point cloud data.

Feature extraction is performed for the sample point cloud data, to obtain classification features; machine learning training is performed for the classification features, to obtain the point cloud classifier. The classification features are acquired by operations of following Steps A1-A4 in the embodiment of the present disclosure, specifically including steps of:

A1: performing K-neighborhood partition for the sample point cloud data, and acquiring a K-neighborhood classification feature.

In order to facilitate the description, in the embodiment of the present disclosure, any point in the sample point cloud data is called as a first sample point. K neighborhood points neighboring the first sample point are selected from the sample point cloud data. A covariance matrix of the first sample point and the K neighborhood points is constructed. The K-neighborhood classification feature corresponding to the first sample point is calculated according to the covariance matrix.

Firstly, feature values $\lambda_1$, $\lambda_2$, $\lambda_3$ are calculated according to the covariance matrix, where $\lambda_1 \geq \lambda_2 \geq \lambda_3 \geq 0$, and the K-neighborhood classification feature corresponding to the first sample point is calculated on the basis of the feature values $\lambda_1$, $\lambda_2$, $\lambda_3$:

$$\text{Sum} = \lambda_1 + \lambda_2 + \lambda_3$$

$$\text{Omnivariance} = \sqrt[3]{\lambda_1 \cdot \lambda_2 \cdot \lambda_3}$$

$$\text{Eigenentropy} = -\sum_{i=1}^{3} \lambda_i \cdot \ln(\lambda_i)$$

$$\text{Anisotropy} = \frac{\lambda_1 - \lambda_3}{\lambda_1}$$

$$\text{Planarity} = \frac{\lambda_2 - \lambda_3}{\lambda_1}$$

$$\text{Linearity} = \frac{\lambda_1 - \lambda_2}{\lambda_1}$$

In the above, Sum is a sum of the feature values, Omnivariance is a total variance of the feature values, Eigenentropy is a feature entropy, Anisotropy is anisotropy, Planarity is a degree of planarity, and Linearity is a degree of linearity.

For each of the other sample points in the sample point cloud data, K neighborhoods corresponding to each of the other sample points are partitioned in the same manner as the above for the first sample point, and the K-neighborhood classification feature corresponding to each of the other sample points is calculated.

A2: performing grid neighborhood partition for the sample point cloud data, and acquiring a grid neighborhood classification feature.

The sample point cloud data is partitioned into a plurality of grids with a preset dimension. In order to facilitate the description, any grid partitioned in the embodiment of the present disclosure is called as a first grid. A maximum elevation value of point cloud in the first grid and a minimum elevation value of point cloud in a second grid neighboring the first grid are acquired. A difference between the maximum elevation value of point cloud and the minimum elevation value of point cloud is calculated, and the difference is determined as a grid neighborhood classification feature corresponding to the first grid.

For each of the other grids partitioned, the grid neighborhood classification feature corresponding to each of the other grids is calculated in the same manner as the above for the first grid.

A3: performing cylindrical neighborhood partition for the sample point cloud data, and acquiring a cylindrical neighborhood classification feature.

Likewise, the first sample point is any point in the sample point cloud data. In the sample point cloud data, a cylindrical neighborhood with the first sample point as a center, a radius of R, and a height of H, is partitioned. Point cloud layering is performed for the cylindrical neighborhood corresponding to the first sample point according to a preset layering rule. Number of points included in each layer, an elevation value of each point included in each layer, and a central point height of each layer are recorded. A cylindrical neighborhood classification feature corresponding to the first sample point is calculated according to the number of points included in each layer, the elevation value of each point included in each layer, and the central point height of each layer. The radius R and the height H mentioned above may be set in advance.

The towers have a characteristic of being continuous in a vertical direction. Point cloud layering is performed from down to up according to a certain height for the points within a range of the first sample point and the cylindrical neighborhood thereof. The number of points included in each layer, the elevation value of each point included in each layer, and the central point height of each layer are recorded. The cylindrical neighborhood classification feature corresponding to the first sample point is calculated according to a calculation result. The cylindrical neighborhood classification feature includes a maximum height deviation, a mean number of points, deviation of number of points, a difference of elevation, a normalized elevation value, and number of non-empty layers. Below a process for calculating each of the cylindrical neighborhood classification features described in turn:

(1) Maximum Height Deviation

Calculating according to a following formula a mean height deviation on the basis of the number of points in each layer and the central point height of each layer:

$$V_1 = \frac{\sum_{i=1}^{N} N_i H_i}{N_i}$$

In the above formula, N is a total number of layers, $N_i$ is number of points included in an $i^{th}$ layer, $H_i$ is a central point height of the $i^{th}$ layer, and $V_1$ is the mean height deviation.

Then the maximum height deviation is calculated according to a following formula:

$$V_2 = \max|H_i - V_1|, i=1,2,\ldots,N$$

where $V_2$ is the maximum height deviation, $H_i$ is the central point height of the $i^{th}$ layer, and $V_1$ is the mean height deviation.

(2) Mean Number of Points

Calculating the mean number of points according to a following formula:

$$N_{ave} = \frac{\sum_{i=2}^{N} N_i}{N-1}$$

where $N_{ave}$ is the mean number of points, N is the total number of layers, and $N_i$ is the number of points included in the $i^{th}$ layer.

(3) Deviation of Number of Points

Calculating the deviation of number of points according to a following formula:

$$N_{dev} = \max|N_i - N_{dev}|, i=2,3,\ldots,N$$

where $N_{dev}$ is the deviation of number of points, and $N_i$ is the number of points included in the $i^{th}$ layer.

(4) Difference of Elevation

Determining a maximum elevation value and a minimum elevation value from the elevation values of all points included in each layer within the cylindrical neighborhood; and calculating a difference between the maximum elevation value and the minimum elevation value to obtain the difference of elevation.

(5) Variance of Elevation

Calculating the variance of elevation of each point within the cylindrical neighborhood according to the elevation values of all points included in each layer within the cylindrical neighborhood.

(6) Normalized Elevation Value

Calculating a height of a central point within the cylindrical neighborhood with respect to a ground point according to the central point height of each layer within the cylindrical neighborhood and the point cloud data corresponding to the ground point included in the sample point cloud data.

(7) Number of Non-Empty Layers

In the process of recording the number of points in each layer, if the number of points included in the $i^{th}$ layer is more than 0, it is recorded as 1, on the contrary, it is recorded as 0, finally, a total number of layers with the value 1 is recorded, and the recorded total number of layers is the number of non-empty layers.

A4: performing spherical neighborhood partition for the sample point cloud data, and acquiring a spherical neighborhood classification feature.

Likewise, the first sample point is any point in the sample point cloud data. In the sample point cloud data, a spherical neighborhood with the first sample point as a center and a radius of r is partitioned. An elevation value of each point within the spherical neighborhood is recorded, a variance of elevation of each point within the spherical neighborhood is calculated, and the variance of elevation is determined as the spherical neighborhood classification feature corresponding to the first sample point. The above-mentioned radius r may be set in advance.

After the classification features are obtained by the above operations of A1-A4, the machine learning training is performed for the classification features, and then the point cloud classifier can be obtained.

Step 103: performing by the point cloud classifier classification for the LiDAR point cloud data to be classified.

The LiDAR point cloud data to be classified is input into the point cloud classifier, automatic classification is performed by the point cloud classifier for the LiDAR point cloud data to be classified, to obtain a point cloud classification result, wherein the point cloud classification result includes the ground points, the electric power lines, the towers, and other types of objects. The other types of objects may be vegetation, advertising board, bus stop, and so on along the electric power transmission line.

After the classification result is obtained, speckling merging optimization is further performed for the point cloud classification result, and classification optimization is performed for the point cloud classification result according to a tower position file and a preset optimization rule.

The speckling merging optimization refers to classifying dispersed points, which may exist within a range of a preset distance around a certain classified object, in this case these dispersed points are also classified as points included in the classified object. For example, dispersed points existing in a range of a preset distance around the classified tower are classified as points included in the tower.

The above tower position file includes coordinate information on each tower on the electric power transmission line. Coordinates of each point included in the classified tower are acquired, and for the coordinates of each point, whether coordinates of this point exist in the tower position file is determined, wherein if yes, it is determined that this point really belongs to the tower, and if not, it is determined that this point does not belong to the tower, and this point is removed from the classified tower. In this way, a mistakenly classified tower point can be removed.

Since trunk of a tree sometimes may be mistakenly classified as an electric power line, it is stipulated according to the above preset optimization rule in the embodiment of the present disclosure that a point above the ground point having a distance from the ground point, with the distance within a certain range is not an electric power line point. After the classification result is obtained, a distance between the ground point and each point classified as the electric power line is calculated, and a point having a distance from the ground point, with the distance less than a certain distance stipulated in the preset optimization rule, is removed, thus a part of mistakenly classified electric power line points may be removed.

Since the LiDAR device inevitably will some generate some noise points when collecting the data, it is further stipulated in the above preset optimization rule that a certain point is an isolated point if number of points within each neighborhood around the point is less than a preset threshold number of points. After the classification result is obtained, according to a neighborhood recording mode, for each classified point whether the number of points within each neighborhood around the classified point is less than the preset threshold number of points stipulated in the preset optimization rule is judged, wherein if yes, the point is determined as an isolated point which is to be removed, in this way, a part of isolated noise points may be removed.

Figure 2:
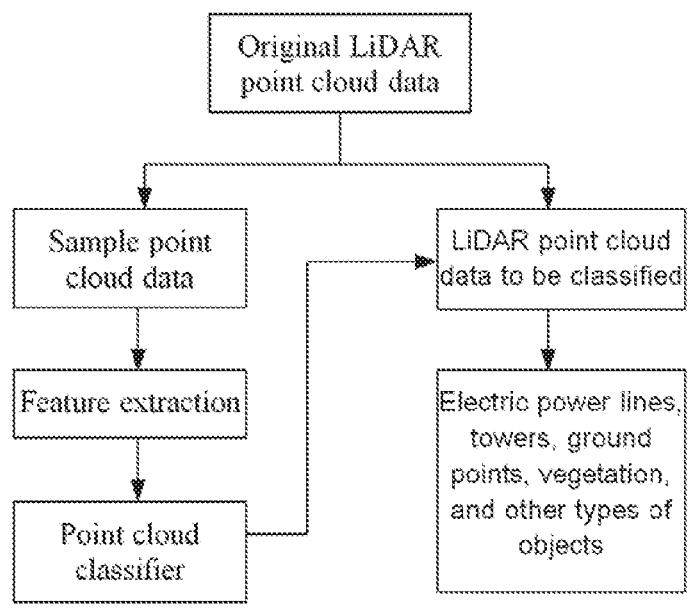
FIG. 2 shows a schematic diagram of classification of LiDAR point cloud data provided in Embodiment 1.

As shown in FIG. 2, in the embodiment of the present disclosure, the original LiDAR point cloud data is acquired from the LiDAR device mounted on the flying platform, the sample point cloud data is selected from the original LiDAR point cloud data, and the remaining point cloud data serves as the LiDAR point cloud data to be classified. The feature extraction is performed for the sample point cloud data, and the point cloud classifier is trained according to the result of the feature extraction. Then, the automatic classification is performed by the point cloud classifier for the LiDAR point cloud data to be classified, to obtain the classified electric power lines, towers, ground points, vegetation, and other types of objects. The point cloud classifier is trained from the sample point cloud data, and the automatic classification is performed by the point cloud classifier for the LiDAR point cloud data to be classified, which greatly improves the accuracy and efficiency of the automatic classification of the electric power lines and the towers, and upon test, the automatic classification has an efficiency of 40 seconds per grade on average (about 3 million points per grade on average). In cases where the selected sample point cloud data is sufficiently representative, the accuracy of the automatic classification may reach 95°.

In the embodiment of the present disclosure, the sample point cloud data and the LiDAR point cloud data to be classified are acquired; the point cloud classifier is built according to the sample point cloud data; the classification is performed by the point cloud classifier for the LiDAR point cloud data to be classified. In the present disclosure, the point cloud classifier is trained from the sample point cloud data, and the automatic classification is performed by the point cloud classifier for the LiDAR point cloud data to be classified, which greatly reduces the factors of manual intervention in the classification process, and has a high degree of automation and low costs. The sample point cloud data used for training the point cloud classifier includes tower data on various types of towers and electric power line data on various types of lines, thus the data is all-round, thereby the point cloud classifier trained from such sample point cloud data is very high in accuracy and is not error-prone. Moreover, after the classification result is obtained from the automatic classification, the speckling merging optimization is further performed, and the optimization is performed according to the tower position file and the preset optimization rule, thus further improving the classification accuracy.

Embodiment 2

Figure 3:
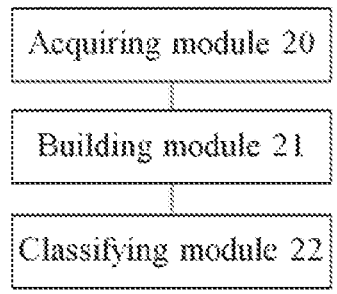
FIG. 3 shows a structural schematic diagram of an apparatus for classifying LiDAR point cloud data provided in Embodiment 2 of the present disclosure.

As shown in FIG. 3, the embodiment of the present disclosure provide an apparatus for classifying LiDAR point cloud data, which apparatus is configured to perform the method for classifying LiDAR point cloud data provided in the above Embodiment 1, and which apparatus includes:

an acquiring module 20, configured to acquire sample point cloud data and LiDAR point cloud data to be classified;

a building module 21, configured to build a point cloud classifier according to the sample point cloud data; and a classifying module 22, configured to perform, by the point cloud classifier, classification for the LiDAR point cloud data to be classified.

Figure 4:
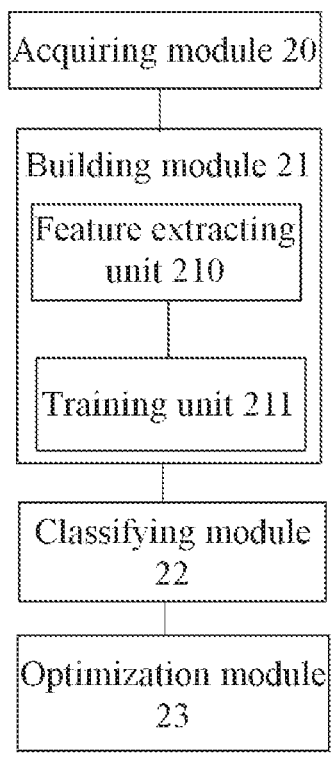
FIG. 4 shows structural schematic diagram of another apparatus for classifying LiDAR point cloud data provided in Embodiment 2 of the present disclosure.

As shown in FIG. 4, the above building module 21 includes:

a feature extracting unit 210, configured to perform feature extraction for the sample point cloud data, to obtain classification features; and a training unit 211, configured to perform machine learning training for the classification features, to obtain the point cloud classifier.

The above feature extracting unit includes:

a K-neighborhood feature extracting subunit, configured to perform K-neighborhood partition for the sample point cloud data, and acquire a K-neighborhood classification feature;

a grid neighborhood feature extracting subunit, configured to perform grid neighborhood partition for the sample point cloud data, and acquire a grid neighborhood classification feature;

a cylindrical neighborhood feature extracting subunit, configured to perform cylindrical neighborhood partition for the sample point cloud data, and acquire a cylindrical neighborhood classification feature; and a spherical neighborhood feature extracting subunit, configured to perform spherical neighborhood partition for the sample point cloud data, and acquire a spherical neighborhood classification feature.

The above K-neighborhood feature extracting subunit is configured to select from the sample point cloud data K neighborhood points neighboring a first sample point, wherein the first sample point is any point in the sample point cloud data; construct a covariance matrix of the first sample point and the K neighborhood points; and calculate the K-neighborhood classification feature corresponding to the first sample point according to the covariance matrix.

The above grid neighborhood feature extracting subunit is configured to partition the sample point cloud data into a plurality of grids with a preset dimension; acquire a maximum elevation value of point cloud in a first grid, which is any grid partitioned, and a minimum elevation value of point cloud in a second grid neighboring the first grid; calculate a difference between the maximum elevation value of point cloud and the minimum elevation value of point cloud, and determine the difference as a grid neighborhood classification feature corresponding to the first grid.

The above cylindrical neighborhood feature extracting subunit is configured to partition, in the sample point cloud data, a cylindrical neighborhood with a first sample point as a center, a radius of R, and a height of H, wherein the first sample point is any point in the sample point cloud data; perform point cloud layering for the cylindrical neighborhood corresponding to the first sample point according to a preset layering rule; record number of points included in each layer, an elevation value of each point included in each layer, and a central point height of each layer; and calculate a cylindrical neighborhood classification feature corresponding to the first sample point according to the number of points included in each layer, the elevation value of each point included in each layer, and the central point height of each layer.

The above spherical neighborhood feature extracting subunit is configured to partition, in the sample point cloud data, a spherical neighborhood with a first sample point as a center and a radius of r, wherein the first sample point is any point in the sample point cloud data; calculate a variance of elevation of each point within the spherical neighborhood, and determine the variance of elevation as a spherical neighborhood classification feature corresponding to the first sample point.

The above classifying module 22 is configured to input the LiDAR point cloud data to be classified, into the point cloud classifier to obtain a point cloud classification result, wherein the point cloud classification result includes the ground points, the electric power lines, and the towers.

As shown in FIG. 4, the apparatus further includes:

an optimization module 23, configured to perform speckling merging optimization for the point cloud classification result, and perform classification optimization for the point cloud classification result according to a tower position file and a preset optimization rule.

In the embodiment of the present disclosure, the sample point cloud data and the LiDAR point cloud data to be classified are acquired; the point cloud classifier is built according to the sample point cloud data; the classification is performed by the point cloud classifier for the LiDAR point cloud data to be classified. In the present disclosure, the point cloud classifier is trained from the sample point cloud data, and the automatic classification is performed by the point cloud classifier for the LiDAR point cloud data to be classified, which greatly reduces the factors manual intervention in the classification process, and has a high degree of automation and low costs. The sample point cloud data used for training the point cloud classifier includes tower data on various types of towers and electric power line data on various types of lines, thus the data is all-round, thereby the point cloud classifier trained from such sample point cloud data is very high in accuracy and is not error-prone. Moreover, after the classification result is obtained from the automatic classification, the speckling merging optimization is further performed, and the optimization is performed according to the tower position file and the preset optimization rule, thus further improving the classification accuracy.

The apparatus for classifying LiDAR point cloud data provided in the embodiment of the present disclosure may be specific hardware on a device or software, firmware or the like installed on a device. An implementation principle of and technical effects produced by the apparatus provided in the embodiment of the present disclosure are the same as those of the preceding method embodiment, and for the sake of concise description, reference can be made to corresponding contents in the preceding method embodiment for contents which are not mentioned in the part of the apparatus embodiment. A person skilled in the art can clearly know that for the sake of convenience and conciseness, reference can be made to corresponding processes in the above method embodiment for specific operation processes of the system, apparatus, and units described in the preceding, and they will not be repeated redundantly herein.

Furthermore, an embodiment of the present disclosure provides a device for classifying LiDAR point cloud data, including a memory and a processor, wherein the memory is configured to store a program supporting the processor to execute any preceding method for classifying LiDAR point cloud data, and the processor is configured to execute the program stored in the memory.

Furthermore, an embodiment of the present disclosure provides a computer storage medium, configured to store a computer software instruction used by any preceding method for classifying LiDAR point cloud data.

It should be understood that in the embodiments provided in the present disclosure, the apparatus and the method disclosed may be implemented in other manners. The apparatus embodiment described in the above is merely exemplary, for example, the units are merely divided according to logical functions, but they may be divided in other manners in practical implementation, for another example, multiple units or components may be combined or may be integrated into another system, or some features may be omitted, or not executed. In addition, mutual couplings or direct couplings or communicative connections as shown or discussed may be indirect couplings or communicative connections via some communication interfaces, means or units, and may be in an electrical form, a mechanical form or other forms.

The said units described as separate parts may be or also may not be physically separated, the parts displayed as units may be or also may not be physical units, i.e., they may be located at one place, or also may be distributed on a plurality of network units. The objects of the solution of the present embodiment may be realized by selecting some or all of the units thereof as actually required.

Besides, various functional units in the embodiments of the present disclosure may be integrated into one processing unit, or each unit also may exist in a physically independent way, and two or more than two units also may be integrated into one unit.

If the function is realized in a form of software functional unit and is sold or used as an individual product, it may be stored in one computer readable storage medium. Based on such understanding, the technical solution of the present disclosure essentially or the part making contribution to the prior art or part of this technical solution can be embodied in a form of software product, and this computer software product is stored in one storage medium, including several instructions used to make one computer device (which may be a personal computer, a sever or a network device etc.) execute all or some of the steps of the methods of various embodiments of the present disclosure. The aforementioned storage medium includes various media in which program codes can be stored, such as U disk, mobile hard disk, Read-Only Memory (ROM), Random Access Memory (RAM), diskette and compact disk.

It should be noted that similar reference signs and letters represent similar items in the following accompanying drawings; therefore, once a certain item is defined in one accompanying drawing, it is not needed to be further defined or explained in subsequent accompanying drawings. Besides, terms such as "first", "second", and "third" are merely for distinctive description, but should not be construed as indicating or implying relative importance.

Finally, it should be indicated that the embodiments above are merely for specific embodiments of the present disclosure, for illustrating the technical solutions of the present disclosure, rather than limiting the present disclosure. The scope of protection of the present disclosure should not be limited thereto. While the detailed description is made to the present disclosure with reference to the above-mentioned embodiments, those ordinarily skilled in the art should understand that the technical solutions recited in the above-mentioned embodiments still can be modified, or readily changed, or equivalent substitutions can be made to some of the technical features therein; these modifications, changes, or substitutions do not make the corresponding technical solutions essentially depart from the spirit and scope of the technical solutions of the embodiments of the present disclosure. They all should be covered within the scope of protection of the present disclosure. Therefore, the scope of protection of the present disclosure should be based on the scope of protection of the claims.

INDUSTRIAL APPLICABILITY

With the application of the technical solutions of the present disclosure, the automatic classification can be performed for the LiDAR point cloud data to be classified by the trained point cloud classifier, which greatly reduces factors of manual intervention in the classification process, has a high degree of automation, low costs, and high efficiency and accuracy, and is not error-prone.

What is claimed is:

1. A method for classifying LiDAR point cloud data, wherein the method comprises:
acquiring sample point cloud data and LiDAR point cloud data to be classified;
constructing a point cloud classifier according to the sample point cloud data; and
classifying the LiDAR point cloud data to be classified by the point cloud classifier,
wherein the step of constructing a point cloud classifier according to the sample point cloud data comprises:
performing feature extraction for the sample point cloud data to obtain classification features; and
performing machine learning training for the classification features to obtain the point cloud classifier,
wherein the step of performing feature extraction for the sample point cloud data to obtain classification features comprises:

performing K-neighborhood partition for the sample point cloud data, and acquiring a K-neighborhood classification feature;

performing grid neighborhood partition for the sample point cloud data, and acquiring a grid neighborhood classification feature;

performing cylindrical neighborhood partition for the sample point cloud data, and acquiring a cylindrical neighborhood classification feature; and performing spherical neighborhood partition for the sample point cloud data, and acquiring a spherical neighborhood classification feature, wherein the step of performing grid neighborhood partition for the sample point cloud data and acquiring a grid neighborhood classification feature comprises:

partitioning the sample point cloud data into a plurality of grids with a preset dimension;

acquiring a maximum elevation value of point cloud in a first grid and a minimum elevation value of point cloud in a second grid neighboring the first grid, wherein the first grid is any grid partitioned; and calculating a difference between the maximum elevation value of point cloud and the minimum elevation value of point cloud, and determining the difference as the grid neighborhood classification feature corresponding to the first grid.

2. The method of claim 1, wherein the step of performing K-neighborhood partition for the sample point cloud data and acquiring a K-neighborhood classification feature comprises:

selecting from the sample point cloud data K neighborhood points neighboring a first sample point, wherein the first sample point is any point in the sample point cloud data;

constructing a covariance matrix of the first sample point and the K neighborhood points; and calculating the K-neighborhood classification feature corresponding to the first sample point according to the covariance matrix.

3. The method of claim 1, wherein the step of performing cylindrical neighborhood partition for the sample point cloud data and acquiring a cylindrical neighborhood classification feature comprises:

partitioning the sample point cloud data to obtain a cylindrical neighborhood with a first sample point as a center, a radius of R, and a height of H, wherein the first sample point is any point in the sample point cloud data;

performing point cloud layering for the cylindrical neighborhood corresponding to the first sample point according to a preset layering rule;

recording number of points included in each layer, an elevation value of each point included in each layer, and a central point height of each layer; and calculating a cylindrical neighborhood classification feature corresponding to the first sample point, according to the number of points included in each layer, the elevation value of each point included in each layer, and the central point height of each layer.

4. The method of claim 1, wherein the step of performing spherical neighborhood partition for the sample point cloud data and acquiring a spherical neighborhood classification feature comprises:

partitioning the sample point cloud data to obtain a spherical neighborhood with a first sample point as a center and a radius of r, wherein the first sample point is any point in the sample point cloud data; and calculating a variance of elevation of each point within the spherical neighborhood, and determining the variance of elevation as the spherical neighborhood classification feature corresponding to the first sample point.

5. The method of claim 1, wherein the step of classifying the LiDAR point cloud data to be classified by the point cloud classifier comprises:

inputting the LiDAR point cloud data to be classified, into the point cloud classifier to obtain a point cloud classification result, wherein the point cloud classification result includes ground points, electric power lines, and towers.

6. The method of claim 5, after the step of classifying the LiDAR point cloud data to be classified by the point cloud classifier, the method further comprising:

performing speckling merging optimization for the point cloud classification result, and performing classification optimization for the point cloud classification result according to a tower position file and a preset optimization rule.

7. The method of claim 1, wherein the sample point cloud data comprises tower point cloud data, electric power line point cloud data, and point cloud data of ground point obtained after selection.

8. A device for classifying LiDAR point cloud data, comprising a memory and a processor, wherein the memory is configured to store a program supporting the processor to execute the method of claim 1, and the processor is configured to execute the program stored in the memory.

9. An apparatus for classifying LiDAR point cloud data, wherein the apparatus comprises:

an acquiring module, configured to acquire sample point cloud data and LiDAR point cloud data to be classified;

a building module, configured to build a point cloud classifier according to the sample point cloud data; and a classifying module, configured to perform, by the point cloud classifier, classification for the LiDAR point cloud data to be classified, wherein the building module comprises:

a feature extracting unit, configured to perform feature extraction for the sample point cloud data, to obtain classification features; and a training unit, configured to perform machine learning training for the classification features, to obtain the point cloud classifier, wherein the feature extracting unit comprises:

a K-neighborhood feature extracting subunit, configured to perform K-neighborhood partition for the sample point cloud data, and acquire a K-neighborhood classification feature;

a grid neighborhood feature extracting subunit, configured to perform grid neighborhood partition for the sample point cloud data, and acquire a grid neighborhood classification feature;

a cylindrical neighborhood feature extracting subunit, configured to perform cylindrical neighborhood partition for the sample point cloud data, and acquire a cylindrical neighborhood classification feature; and a spherical neighborhood feature extracting subunit, configured to perform spherical neighborhood partition for the sample point cloud data, and acquire a spherical neighborhood classification feature, wherein the grid neighborhood feature extracting subunit is configured to partition the sample point cloud data into a plurality of grids with a preset dimension; acquire a maximum elevation value of point cloud in a first grid, which is any grid partitioned, and a minimum elevation value of point cloud in a second grid neighboring the first grid; calculate a difference between the maximum elevation value of point cloud and the minimum elevation value of point cloud; and determine the difference as a grid neighborhood classification feature corresponding to the first grid.

10. The apparatus of claim 9, wherein the classifying module is configured to:
  input the LiDAR point cloud data to be classified, into the point cloud classifier to obtain a point cloud classification result, wherein the point cloud classification result includes ground points, electric power lines, and towers.

11. The apparatus of claim 10, wherein the apparatus further comprises:
  an optimization module, configured to perform speckling merging optimization for the point cloud classification result, and perform classification optimization for the point cloud classification result according to a tower position file and a preset optimization rule.

* * * * *

UNITED STATES PATENT AND TRADEMARK OFFICE
CERTIFICATE OF CORRECTION

PATENT NO. : 11,636,289 B2  
APPLICATION NO. : 16/304673  
DATED : April 25, 2023  
INVENTOR(S) : Yanming Guo Page 1 of 1

It is certified that error appears in the above-identified patent and that said Letters Patent is hereby corrected as shown below:

On the Title Page

| | Reads | Should Read |
|---|---|---|
| Item (73) Assignee: | "Beijing GreenValley Technology Co., Ltd." | "Beijing GreenValley Technology Co., Ltd.; Shenzhen GreenValley Intelligent Technology Co., Ltd." |

Signed and Sealed this  
Twenty-seventh Day of May, 2025

Coke Morgan Stewart  
*Acting Director of the United States Patent and Trademark Office*